United States Patent
Lin et al.

(10) Patent No.: US 12,533,032 B2
(45) Date of Patent: Jan. 27, 2026

(54) THERMAL IMAGE ENDOSCOPE SYSTEM

(71) Applicant: GIGA-IMAGE Technology Co., Ltd., Taipei (TW)

(72) Inventors: Chih-Ju Lin, New Taipei (TW); Yi-Wei Liu, New Taipei (TW)

(73) Assignee: GIGA-IMAGE Technology Co., Ltd., Taipei (TW)

( * ) Notice: Subject to any disclaimer, the term of this patent is extended or adjusted under 35 U.S.C. 154(b) by 168 days.

(21) Appl. No.: 18/373,609

(22) Filed: Sep. 27, 2023

(65) Prior Publication Data
US 2024/0315564 A1    Sep. 26, 2024

(30) Foreign Application Priority Data

Mar. 23, 2023  (CN) .......................... 202310286178.6

(51) Int. Cl.
*A61B 5/00*    (2006.01)
*A61B 18/22*    (2006.01)
*G06T 7/00*    (2017.01)

(52) U.S. Cl.
CPC .......... *A61B 5/0086* (2013.01); *A61B 5/0036* (2018.08); *A61B 18/22* (2013.01); *G06T 7/0012* (2013.01); *A61B 5/742* (2013.01); *A61B 2560/02* (2013.01); *A61B 2560/0443* (2013.01); *A61B 2560/066* (2013.01); *A61B 2562/0271* (2013.01); *G06T 2207/10048* (2013.01);
(Continued)

(58) Field of Classification Search
CPC ..... A61B 5/0086; A61B 5/0036; A61B 18/22; A61B 5/742; A61B 2560/02; A61B 2560/0443; A61B 2560/066; A61B 2562/0271; A61B 5/004; A61B 5/015; A61B 1/05; A61B 1/00006; A61B 1/00009; A61B 1/00045; G06T 7/0012; G06T 2207/10048; G06T 2207/20021; G06T 2207/20224; G06T 2207/30096
See application file for complete search history.

(56) References Cited

U.S. PATENT DOCUMENTS 10,537,226 B2 * 1/2020 Han ................... A61B 1/00172
2004/0124791 A1 * 7/2004 Takahashi ............ A61B 1/0646
315/297
(Continued)

*Primary Examiner* — Baisakhi Roy
(74) *Attorney, Agent, or Firm* — Birch, Stewart, Kolasch & Birch, LLP

(57) ABSTRACT

A thermal image endoscope system includes a thermal image endoscope catheter and a control device. The thermal image endoscope catheter including: a tube body; a thermal image capturing assembly and a disposing component are positioned at a head part of the tube body, the thermal image capturing assembly captures a thermal image from a shooting area; the disposing component has a disposing area and the disposing area is inside the shooting area; a towing component is connected to the head part. The control device including: a driving component is connected to a towing component, a controller actuates the driving component according to a disposing command received by a receiving component to drive the towing component to tow the head part, and actuates a gate of a light guide assembly to selectively couple or decouple a light pipe of the light guide assembly to the disposing component.

10 Claims, 11 Drawing Sheets

(52) U.S. Cl.
CPC ............... *G06T 2207/20021* (2013.01); *G06T 2207/20224* (2013.01); *G06T 2207/30096* (2013.01)

(56) References Cited

U.S. PATENT DOCUMENTS

| | | | |
|---|---|---|---|
| 2015/0213317 A1* | 7/2015 | Chiang | G08B 21/0476 |
| | | | 348/143 |
| 2018/0067299 A1* | 3/2018 | Kim | G02B 23/12 |
| 2020/0100647 A1* | 4/2020 | Craig | A61B 1/00078 |
| 2021/0093224 A1* | 4/2021 | Morishima | A61B 1/0002 |
| 2022/0221696 A1* | 7/2022 | Capriotti | G02B 13/14 |
| 2023/0248209 A1* | 8/2023 | Tanigami | A61B 1/05 |
| | | | 600/109 |

\* cited by examiner

FIG. 7C

| $A_{10}$ | $A_{11}$ | $A_{12}$ | $A_{13}$ | $A_{14}$ | $A_{15}$ | $A_{16}$ | $A_{17}$ | $A_{18}$ | $A_{19}$ |
|---|---|---|---|---|---|---|---|---|---|
| $A_{20}$ | $A_{21}$ | $A_{22}$ | $A_{23}$ | $A_{24}$ | $A_{25}$ | $A_{26}$ | $A_{27}$ | $A_{28}$ | $A_{29}$ |
| $A_{30}$ | $A_{31}$ | $A_{32}$ | $A_{33}$ | $A_{34}$ | $A_{35}$ | $A_{36}$ | $A_{37}$ | $A_{38}$ | $A_{39}$ |
| $A_{40}$ | $A_{41}$ | $A_{42}$ | $A_{43}$ | $A_{44}$ | $A_{45}$ | $A_{46}$ | $A_{47}$ | $A_{48}$ | $A_{49}$ |
| $A_{50}$ | $A_{51}$ | $A_{52}$ | $A_{53}$ | $A_{54}$ | $A_{55}$ | $A_{56}$ | $A_{57}$ | $A_{58}$ | $A_{59}$ |
| $A_{60}$ | $A_{61}$ | $A_{62}$ | $A_{63}$ | $A_{64}$ | $A_{65}$ | $A_{66}$ | $A_{67}$ | $A_{68}$ | $A_{69}$ |
| $A_{70}$ | $A_{71}$ | $A_{72}$ | $A_{73}$ | $A_{74}$ | $A_{75}$ | $A_{76}$ | $A_{77}$ | $A_{78}$ | $A_{79}$ |
| $A_{80}$ | $A_{81}$ | $A_{82}$ | $A_{83}$ | $A_{84}$ | $A_{85}$ | $A_{86}$ | $A_{87}$ | $A_{88}$ | $A_{89}$ |

FIG. 7D

THERMAL IMAGE ENDOSCOPE SYSTEM

CROSS-REFERENCE TO RELATED APPLICATION

This non-provisional application claims priority under 35 U.S.C. § 119(a) to Patent Application No. 202310286178.6 filed in China on Mar. 23, 2023, the entire contents of which are hereby incorporated by reference.

BACKGROUND

Technical Field

The present invention relates to an endoscope system, and particularly relates to an endoscope system configured to capture a tissue thermal image and/or selectively disposing abnormal tissues.

Related Art

An endoscope usually includes an endoscopic catheter and a visible light source. During some surgeries, the endoscope will irradiate human tissues with the visible light source, and use a developer as a xenobiotic to generate tissue fluorescence difference by a cellular metabolic difference method so as to assist in identifying abnormal tissues in a human body. With the advancement of technology, some endoscopes have begun to cooperate with a tumor ablation apparatus, which requires users to operate and control the position of the ablation apparatus to align with abnormal tissues for ablation.

When designing an endoscope system, the inventor intended to avoid the use of the developers that would invisibly increase the burden on human tissues, and to avoid a situation that the endoscope cannot detect the abnormal tissues in a visible light band due to the absence of significant color changes in the tissues. Meanwhile, the inventor needs to ensure that it can objectively and accurately target the abnormal tissues so that the users can ablate the abnormal tissues.

SUMMARY

In view of the above needs of the inventors, the present invention provides a thermal image endoscope system. According to one embodiment, the thermal image endoscope system includes a thermal image endoscope catheter and a control device. The thermal image endoscope catheter includes a tube body, a thermal image capturing assembly, a disposing component and a towing component. The tube body having a head part at one end. The thermal image capturing assembly is positioned at the head part and the thermal image capturing assembly capturing a thermal image from a shooting area, and converting the thermal image into an image signal. The disposing component is positioned in the tube body, and one end of the disposing component is positioned at the head part. A disposing area of the disposing component being inside the shooting area. The towing component is positioned in the tube body and connected to the head part. The control device includes a receiving component, a driving component, a light guide assembly and a controller. The receiving component receiving a disposing command. The driving component is connected to the towing component. The light guide assembly includes a light pipe and a gate. The light pipe includes an input end and an output end. The gate is actuated to selectively couple or decouple the output end of the light pipe to the disposing component. The controller actuating the driving component according to the disposing command so as to drive the towing component to tow the head part, and actuating the gate.

In some embodiments, the thermal image endoscope system includes a computer. The computer includes a display, an input element and a processor. The input element receiving an input signal. The processor enabling the display to display a visual image according to an image signal. The processor outputting the disposing command according to the input signal.

In some embodiments, the thermal image endoscope system includes a laser apparatus. The laser apparatus includes a light emitting tube. The light emitting tube is coupled to the input end of the light pipe. The laser apparatus is actuated to emit laser through the light emitting tube.

The present invention further provides a thermal image endoscope catheter. According to one embodiment, the thermal image endoscope catheter includes a tube body, a thermal image capturing assembly, a disposing component and a towing component. One end of the tube body is provided with a head part, and the other end of the tube body is provided with a connecting part. The thermal image capturing assembly is positioned at the head part and the thermal image capturing assembly capturing a thermal image from a shooting area and converting the thermal image into an image signal and output the image signal from the connecting part. The disposing component includes a disposing head and an optical fiber, the optical fiber is positioned in the tube body, and the disposing head is positioned at the head part. One end of the optical fiber is positioned at the connecting part, and the other end of the optical fiber is coupled to the disposing head. The disposing area of the disposing component being inside the shooting area. The towing component is positioned in the tube body and connected to the head part. The head part of the tube body is towed when the towing component is actuated.

The present invention further provides a method for determining abnormal areas of a thermal image. According to one embodiment, the method for determining the abnormal areas of the thermal image includes: receiving a visual image, the visual image including a plurality of thermal pixels arranged in a two-dimensional manner, and each of the thermal pixels having a temperature; obtaining an average temperature according to the temperatures; and determining whether the difference between the temperature of the adjacent thermal pixels and the average temperature is higher than a preset temperature difference, and taking the adjacent thermal pixels as abnormal areas when the difference between the temperature of the adjacent thermal pixels and the average temperature is higher than the preset temperature difference is met.

The detailed features and advantages of the present invention are described in detail in the implementations below, which are sufficient to enable any skilled in the art to understand the technical content of the present invention and implement it accordingly. Moreover, based on the content disclosed in this specification, the scope of claims, and the accompanying drawings, any skilled in the art may easily understand the purpose and advantages of the present invention.

BRIEF DESCRIPTION OF THE DRAWINGS

FIG. 7C is an abnormal marking process displayed according to a visual image schematic diagram (II) of some embodiments;

FIG. 7D is an abnormal marking process displayed according to a visual image schematic diagram (III) of some embodiments.

DETAILED DESCRIPTION

Figure 1:
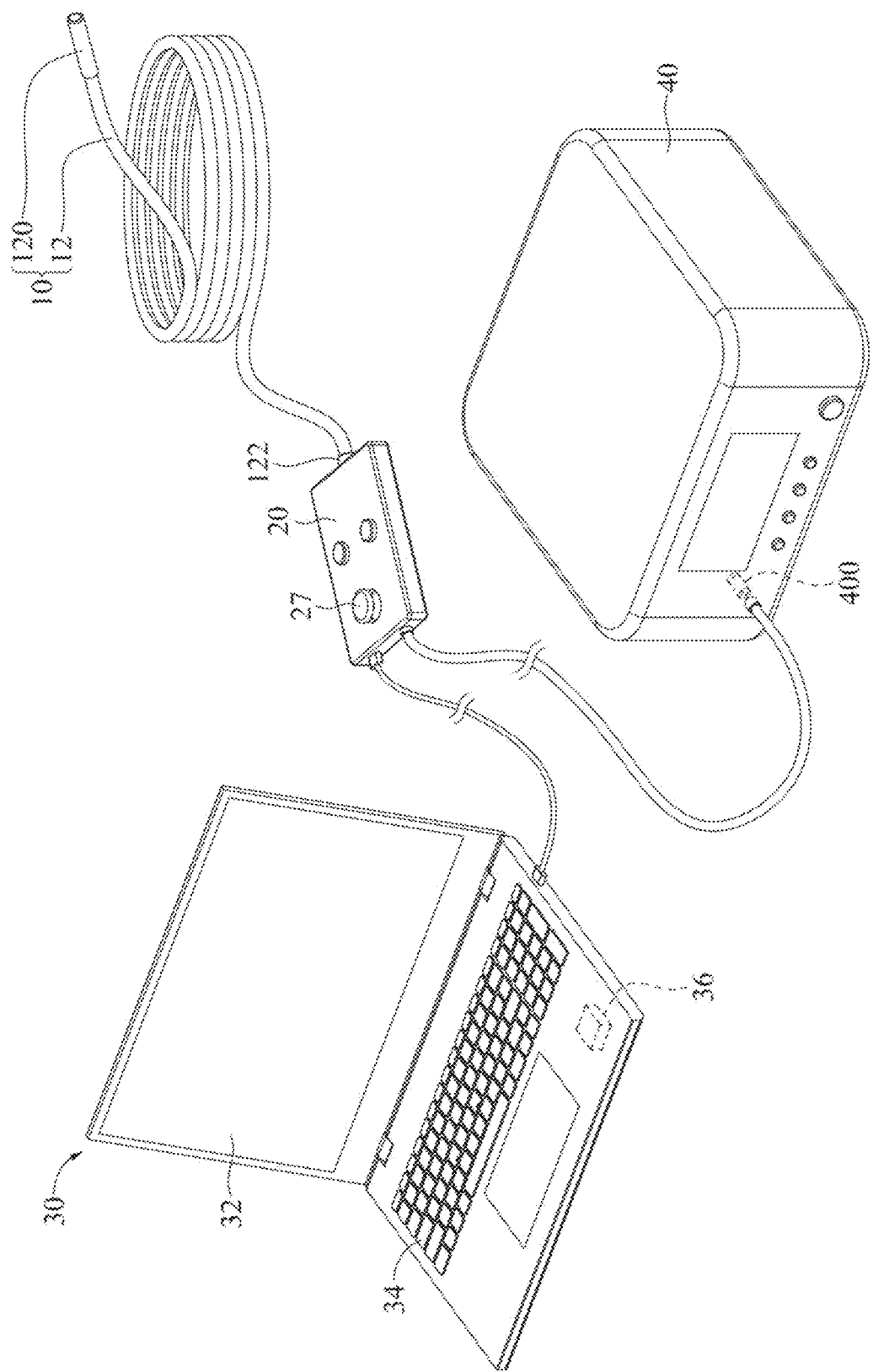
FIG. 1 is a three-dimensional schematic diagram of a thermal image endoscope system according to some embodiments.
Figure 3:
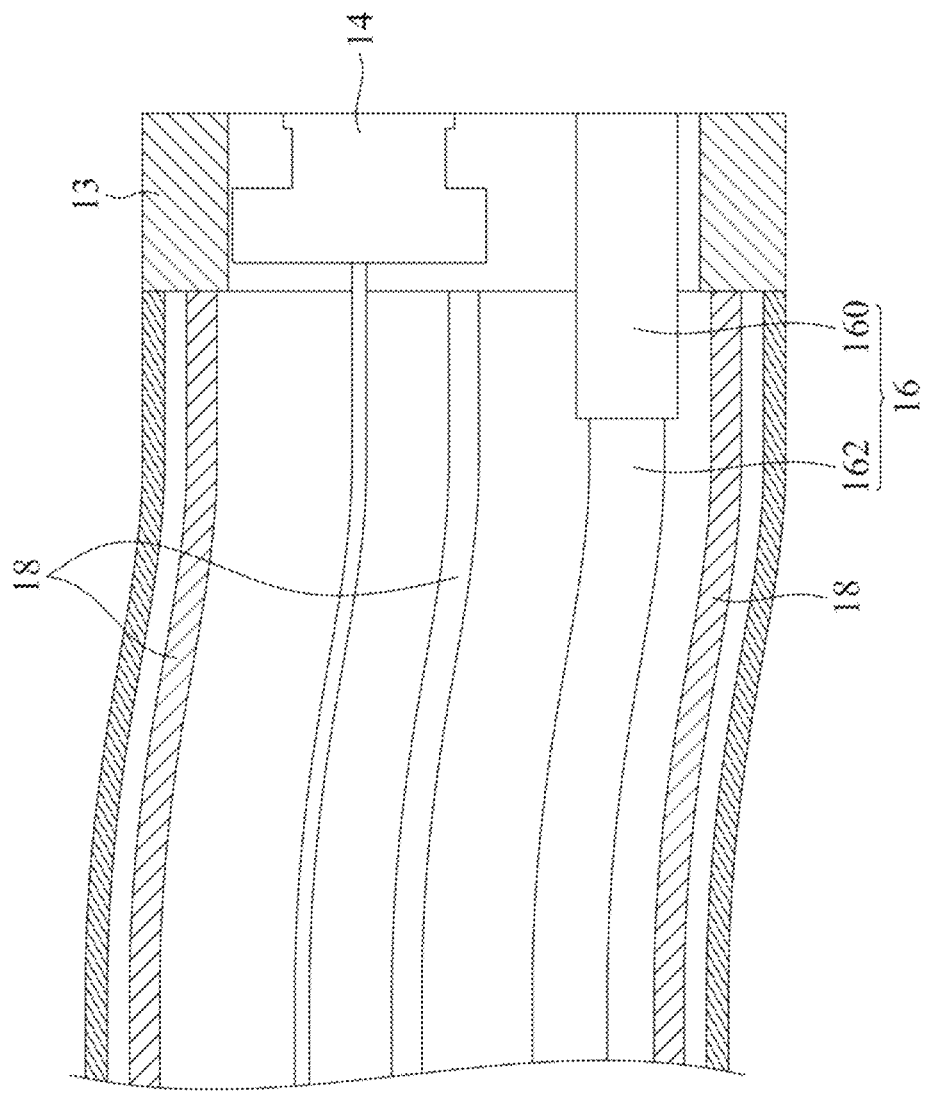
FIG. 3 is a local sectional schematic diagram of a thermal image endoscope catheter according to some embodiments.

As shown in FIG. 1 and FIG. 3, FIG. 1 is a three-dimensional schematic diagram of a thermal image endoscope system according to some embodiments, and FIG. 3 is a local sectional schematic diagram of a thermal image endoscope catheter according to some embodiments. The thermal image endoscope system includes a thermal image endoscope catheter 10 and a control device 20. When operating, a user can place one end of the thermal image endoscope catheter 10 into the human body, and can control the position of a shooting area of a thermal image capturing assembly 14 of the thermal image endoscope catheter 10 in the human body through the control device 20. In some embodiments, the thermal image endoscope system further includes a computer 30; the computer 30 includes a display 32; and the display 32 displays an image signal captured by the thermal image capturing assembly 14 from the shooting area as a visual image for the user to view. In some embodiments, the thermal image endoscope system further includes a laser apparatus 40. The laser apparatus 40 is actuated to emit laser. When abnormal tissues are observed in the visual image, the user can drive the laser apparatus 40 to emit laser, thus ablating the abnormal tissues through a disposing component 16 of the thermal image endoscope catheter 10.

Figure 4:
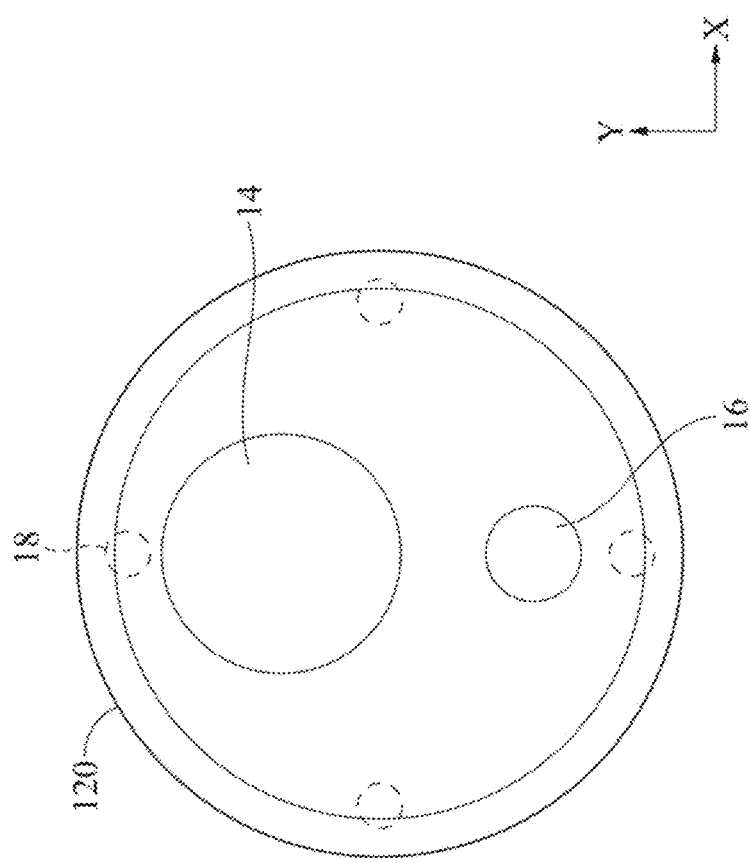
FIG. 4 is a schematic diagram of an end surface of a head part of a thermal image endoscope catheter according to some embodiments.
Figure 5:
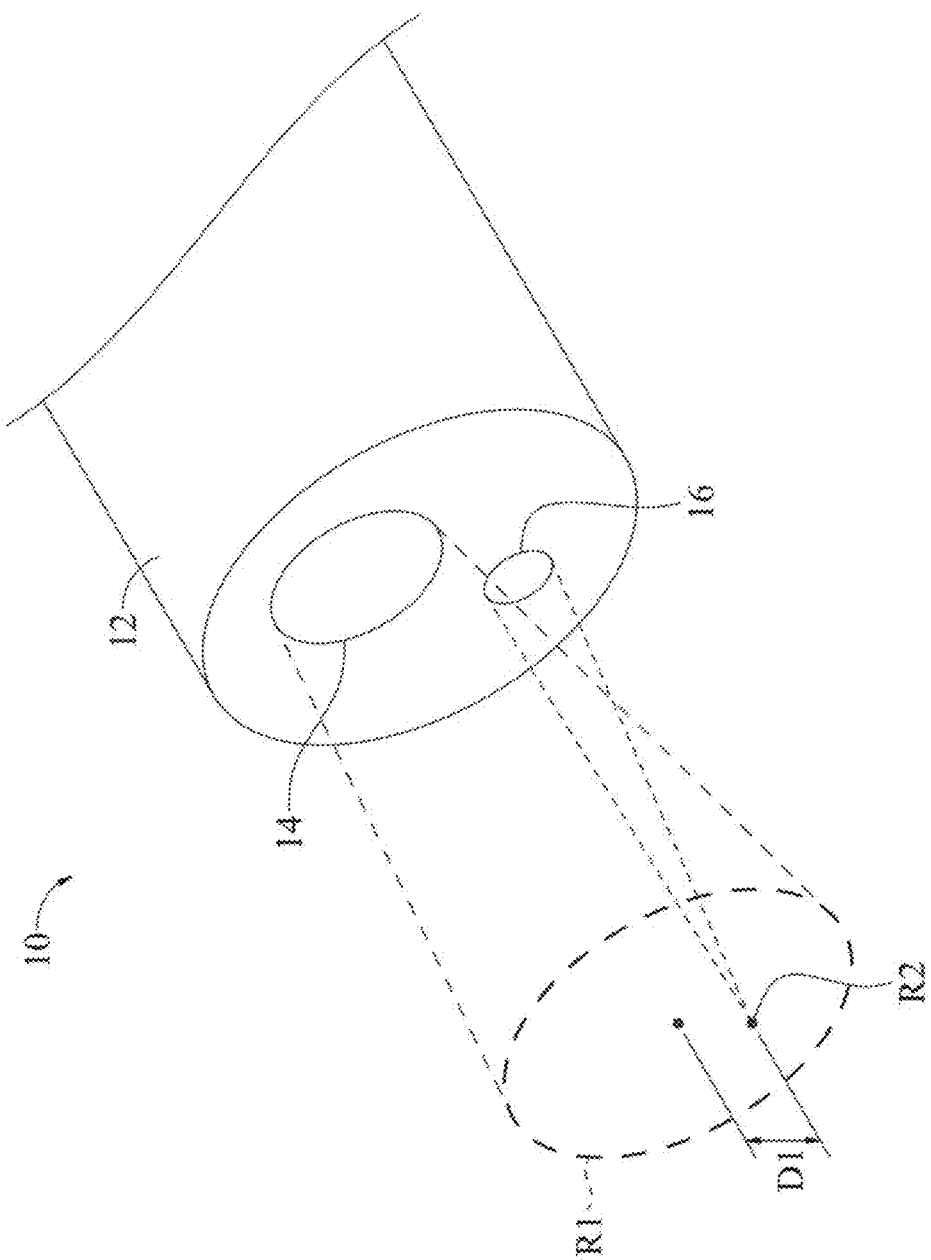
FIG. 5 is a schematic diagram of a head part, a shooting area and a disposing area according to some embodiments.

As shown in FIG. 1 to FIG. 5, FIG. 2 is a structural schematic diagram of a control device of a thermal image endoscope system according to some embodiments, FIG. 4 is a schematic diagram of an end surface of a head part of a thermal image endoscope catheter according to some embodiments, and FIG. 5 is a schematic diagram of a head part, a shooting area and a disposing area according to some embodiments. The thermal image endoscope system includes a thermal image endoscope catheter 10 and a control device 20. The thermal image endoscope catheter 10 includes a tube body 12, a thermal image capturing assembly 14, a disposing component 16 and a towing component 18. One end of the tube body 12 is provided with a head part 120 (shown as FIG. 1). The thermal image capturing assembly 14 is positioned at the head part 120 of the tube body 12. When the head part 120 enters the human body for thermal image shooting, the thermal image capturing assembly 14 captures a thermal image from a shooting area R1 (shown as FIG. 5) and converts the thermal image into an image signal. The disposing component 16 is positioned in the tube body 12, and one end of the disposing component 16 (shown as FIG. 3) is positioned at the head part 120. The disposing component 16 has a disposing area R2 (shown as FIG. 5), and the disposing area R2 is inside the shooting area R1, as shown in FIG. 5. The towing component 18 is positioned in the tube body 12 and connected to the head part 120, as shown in FIG. 3 and FIG. 4. The control device 20 includes a receiving component 22, a driving component 24, a light guide assembly 26 and a controller 28. The receiving component 22 receives a disposing command from the computer 30 (described later). The driving component 24 is connected to the towing component 18. The light guide assembly 26 includes a light pipe 260 and a gate 266, and the light pipe 260 includes an input end 262 and an output end 264. The input end 262 can receive a light source from the laser apparatus 40, and the output end 264 is in butt joint with the disposing component 16. The gate 266 is actuated to selectively optically couple or decouple the output end 264 of the light pipe 260 to the disposing component 16. For example, when the gate 266 is in an open state, the laser source can be coupled to the disposing component 16 through the output end 264 from the light pipe 260. When the gate 266 is in a closed state, the light source is blocked at the light pipe 260 by the gate 266 and does not reach the disposing component 16. An optical connector may be additionally arranged at the gate 266 to achieve an optical coupling effect. The controller 28 actuates the driving component 24 according to a disposing command so as to drive the towing component 18 to tow the head part 120, and actuate the gate 266.

Therefore, when the user places the head part 120 of the thermal image endoscope catheter 10 into the human body, the control device 20 can be controlled to link the towing component 18 through the driving component 24 so as to adjust the angle of the head part 120, and then the position of the shooting area R1 of the thermal image capturing assembly 14 can be adjusted (described later).

In some embodiments, one end of the tube body 12 is provided with the head part 120, and the other end of the tube body is provided with a connecting part 122. The connecting part 122 is connected to the control device 20. The connecting part 122 is connected to the control device 20 to realize electric connection of the thermal image capturing assembly 14 to the control device, connection of the towing component 18 to the driving component 24, and butt joint of the disposing component 16 to the light pipe 260. The connecting part 122 may be a common connector or a special connector.

As shown in FIG. 3, in some embodiments, the thermal image endoscope catheter 10 includes a metal loop 13. The metal loop 13 is positioned at the head part 120 of the tube body 12 and is configured to fix one end of the thermal image capturing assembly 14 and one end of the disposing component 16, so that the thermal image capturing assembly 14 and the disposing component 16 can be remained at fixed relative positions at the head part 120 of the tube body 12. The thermal image capturing assemblies 14 with different models, focal lengths and view angles can be adopted, and the disposing components 16 with different sizes and disposing depths can be adopted, so the distance of relative positions of the thermal image capturing assemblies 14 and the disposing components 16 is not limited, but is determined according to the lens diameters of the thermal image capturing assemblies 14, the sizes of one ends of the disposing components 16 and the diameter (thickness) of the tube body 12. For example, if the lens diameter of the adopted thermal image capturing assembly 14 is 5 mm, the diameter of the disposing component 16 at one end of the head part 120 is 1.8 mm, and the diameter of the cross section of the tube body 12 is 10 mm, the relative position of the thermal image capturing assembly 14 and the disposing component 16 (namely the distance between the center position of a lens of the thermal image capturing assembly 14 and the center position of the disposing component 16) may be 3.6 mm. The relative position at the thermal image capturing assembly 14 and the disposing component 16 remains fixed to facilitate the calculation of a rotating angle of the driving component 24.

As shown in FIG. 5, the shooting area R1 of the thermal image capturing assembly 14 is a focal length area of the thermal image capturing assembly 14, that is, the thermal image captured in the focal length area is clear. Similarly, the disposing area R2 of the disposing component 16 refers to a focal area of the disposing component 16 when processing tissue (for example, a focal area of laser light for disposing tissue). A preset distance D1 is provided between the shooting area R1 and the disposing area R2, and the preset distance D1 may be, but is not limited to, the distance from the central point of the shooting area R1 to the central point of the disposing area R2. The use of the preset distance D1 will be described later.

Figure 2:
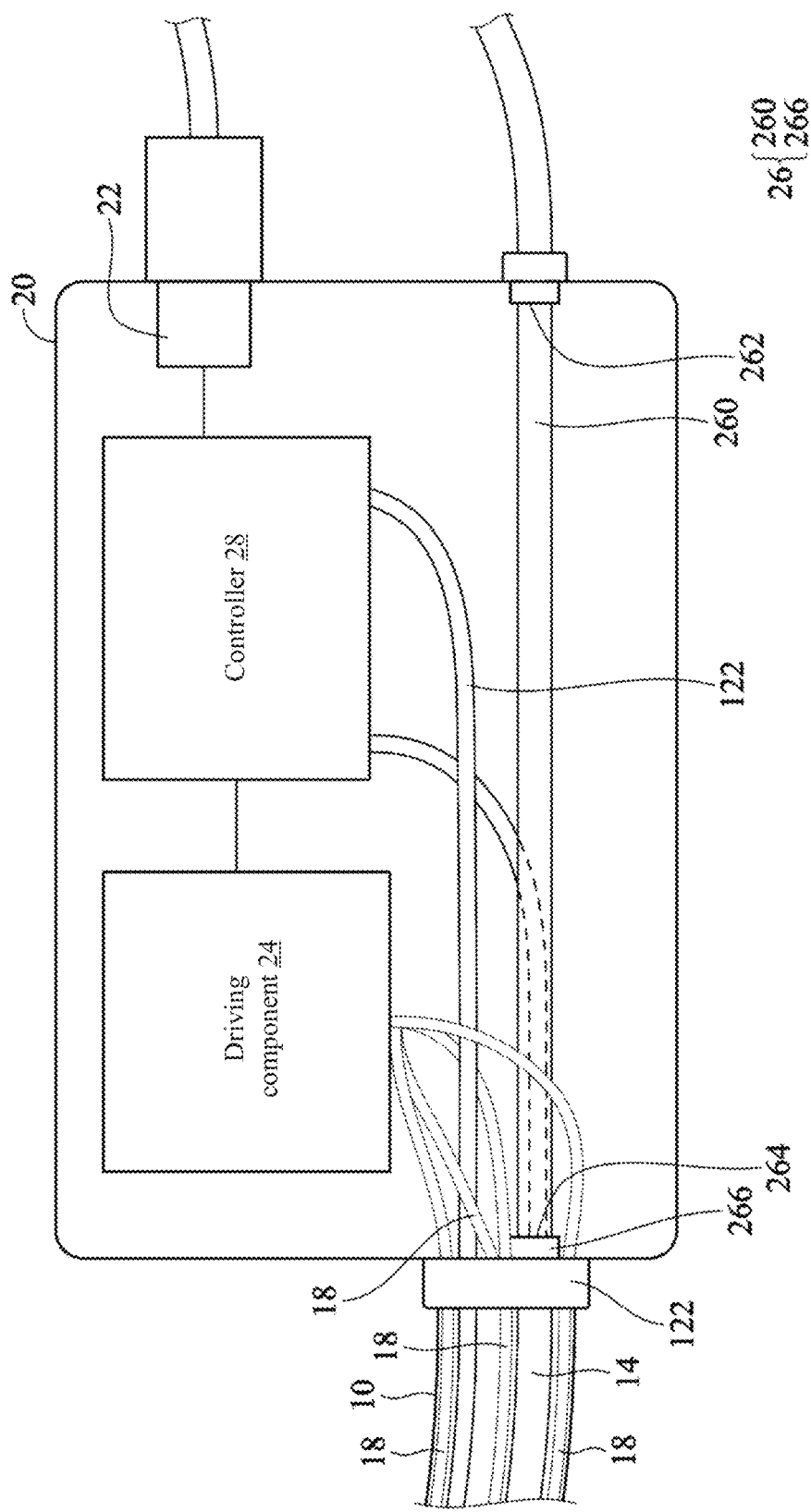
FIG. 2 is a structural schematic diagram of a control device of a thermal image endoscope system according to some embodiments.

As shown in FIG. 2 and FIG. 3, in some embodiments, the thermal image endoscope catheter 10 includes a plurality of towing components 18, such as but not limited to 4 towing components 18 according to the embodiment shown as FIG. 2. The towing components 18 can be pull wires, and the materials of the towing components may be memory metal materials. One end of each of the towing components 18 is connected to the driving component 24, and the other end of each of the towing components is connected to the head part 120 of the tube body 12 of the thermal image endoscope catheter 10. As shown in FIG. 4, the four towing components 18 are connected to the positions of quartiles of the head part 120 (namely, each two are spaced by about 90 degrees). According to the embodiments shown as FIG. 2, FIG. 3 and FIG. 4, a double-shaft motor is taken as an example of the driving component 24, and four pull wires are taken as examples of the towing components 18. The double-shaft motor may include an X shaft and a Y shaft. One end of each of the two towing components 18 is connected to the X shaft of the double-shaft motor, and the other end of each of the two towing components is connected to a 90-degree position and a 270-degree position of the head part 120 shown as FIG. 4. One end of each of the other two towing components 18 is connected to the Y shaft of the double-shaft motor, and the other end of each of the other two towing components is connected to a 0-degree position and a 180-degree position of the head part 120 shown as FIG. 4. The double-shaft motor controls the rotating speed and/or the rotating angle of the X shaft and/or the Y shaft. Therefore, when the X shaft of the driving component 24 is driven to pull the two towing components 18 at the 90-degree position and the 270-degree position shown as FIG. 4, the head part 120 swings towards the +X direction or −X direction shown as FIG. 4; and similarly, when the driving component 24 is driven to pull the two towing components 18 at the 0-degree position and the 180-degree position shown as FIG. 4, the head part 120 swings towards the +Y direction or −Y direction shown as FIG. 4. Therefore, the controller 28 can control the head part 120 to rotate towards the +X direction, −X direction, +Y direction and/or −Y direction according to the disposing command. In some embodiments, the driving component 24 is but not limited to the double-shaft motor, a servo motor or a stepping motor.

As shown in FIG. 1, in some embodiments, the control device 20 includes a remote lever 27; the remote lever 27 can be controlled by the user to control the rotating angle of the head part 120 of the thermal image endoscope catheter 10; and the remote lever 27 may be a remote lever providing two-dimensional input. The remote lever 27 is coupled to the controller 28; and after the user inputs a direction instruction through the remote lever 27, the remote lever 27 will transmit a corresponding signal to the controller 28, and then the controller 28 controls the driving component 24 to drive the corresponding towing component 18 to tow the head part 120.

According to the embodiments above, the thermal image capturing assembly 14 can be configured to detect thermal radiation of the human body, such as an infrared imaging assembly. The band which can be detected by the infrared imaging assembly is 7.5-14 microns (μM), and the band of infrared radiation emitted by the human body is 8-12 microns. The abnormal tissue and normal tissue of the human body have metabolic and behavioral characterization differences, so the abnormal tissues will generate regional temperature differences. Therefore, the temperature of the human tissue can be obtained through the thermal image capturing assembly 14 so as to determine whether there is abnormal tissue. Except the infrared imaging assembly, other thermal image assemblies with receiving bands configured to cover the radiant heat range of the human body can achieve the effect, and the thermal radiation of the human body is used as a detection object of the thermal image capturing assembly 14, so that any developer does not need to increase the burden of the body. The thermal image capturing assembly 14 is selected mainly with the smaller volume but the larger view. In addition, the thermal image capturing assembly 14 configured to output images with different spatial resolutions can be carried according to the requirements of the user. The spatial resolution will influence the definition of the abnormal tissue image. When the abnormal tissue in the human body is detected, the thermal image endoscope system can identify smaller abnormal tissue and obtain the size of the abnormal tissue more accurately through the larger spatial resolution. For example, when the thermal image capturing assembly 14 with the spatial resolution of 10-20 microns is adopted, the precision of the size of the tumor cells can be observed, and then the effect of detecting abnormal tissue such as tumor cells can be achieved. The thermal image endoscope system can be applied to abdominal cavity, upper digestive tract and lower digestive tract detection of the human body, can be directly guided into the abdominal cavity for image assistance in an abdominal cavity surgery, and can also be applied to upper digestive tract and lower digestive tract detection and postoperative detection.

In some embodiments, the thermal image endoscope system may include a computer 30. The computer 30 includes a display 32, an input element 34 and a processor 36. The input element 34 is configured to receive an input signal. The processor 36 enables the display 32 to display the visual image according to the image signal. The processor 36 outputs the disposing command according to the input signal. In some embodiments, the computer 30 is coupled to the receiving component 22, and the computer 30 is coupled to the receiving component 22, for example, but not limited to, through a USB connecting line. The thermal image capturing assembly 14 captures the thermal image from the shooting area R1, converts the thermal image into the image signal, and transmits the image signal to the processor 36 through the control device 20. The control device 20 may transmit the image signal to the computer 30 in a wired or wireless mode.

Figure 6:
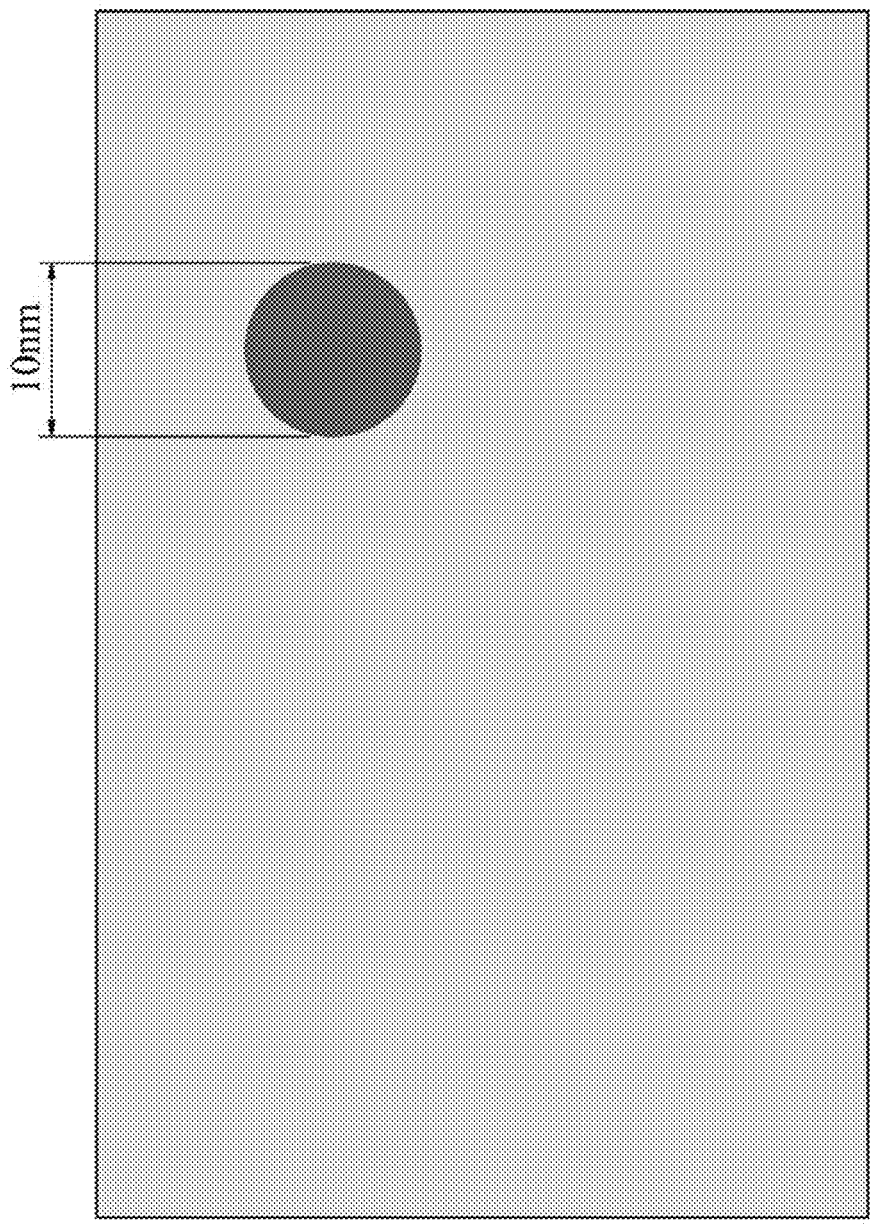
FIG. 6 is a schematic diagram of a visual image according to some embodiments.

The processor 36 enables the display 32 to display a visual image according to the image signal. The visual image is, for example, but not limited to, a visual image shown as FIG. 6. The user can visually identify whether there are abnormal tissues through this visual image. In some embodiments, the visual image displays different temperatures in different colors; and the abnormal tissue may be presented in a striking manner, so that the effect of visually identifying the abnormal area by the user is achieved. Taking the embodiment shown as FIG. 6 as an example, as shown in FIG. 6, the tissue is presented with the proper temperature in a lighter gray color, and the tissue with the abnormal temperature is presented in a darker gray color. The visual image includes a plurality of thermal pixels A arranged in a two-dimensional manner, the view size represented by each of the thermal pixels A of the visual image is not limited, and only needs to reach an individual unit configured to accurately represent the detected object (such as human tissue). Each of the thermal pixels A has a temperature, and the temperature corresponds to the temperature of the regional tissue. The visual image maps the shooting area R1 of the thermal image capturing assembly 14, so that each of the thermal pixels A of the visual image corresponds to each of the tissue points of the shooting area R1, and the temperature of each of the thermal pixels A is the temperature of each of the corresponding tissue points. The processor 36 may also obtain the range of the abnormal area according to the number of the thermal pixels A and the area of each of the corresponding tissue points, and the range of the abnormal area is marked at the abnormal area in the visual image, such as that the size of the area marked with the darker gray is 10 mm shown as FIG. 6.

As shown in FIG. 6, in some embodiments, the processor 36 performs an abnormal marking process on the image signal, so that the display 32 can selectively display an abnormal mark on the visual image. The selectivity refers to that in the human body local tissue captured by the thermal image capturing assembly 14, if the processor 36 determines that there is an area conforming to the abnormal area, the display 32 will display the area in an abnormal marking mode; and if the processor 36 does not detect the abnormal area, no abnormal mark will be marked in the visual image. The number of abnormal marks in the visual image is not limited to one, and a plurality of abnormal marks may be displayed at the same time.

Figure 7A:
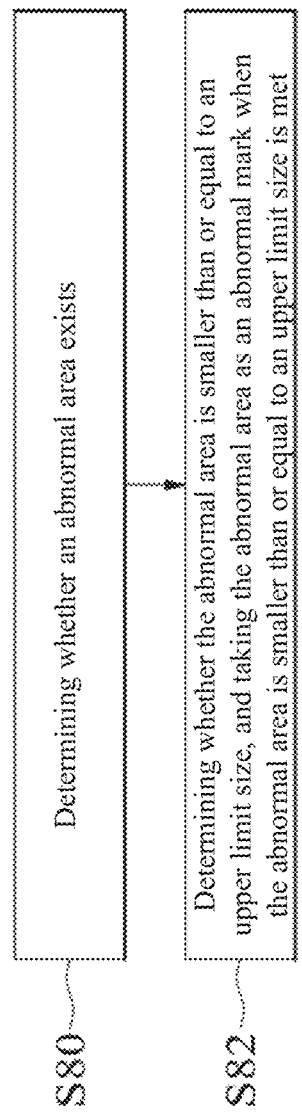
FIG. 7A is a flow schematic diagram of an abnormal marking flow of a visual image according to some embodiments.
Figure 7B:
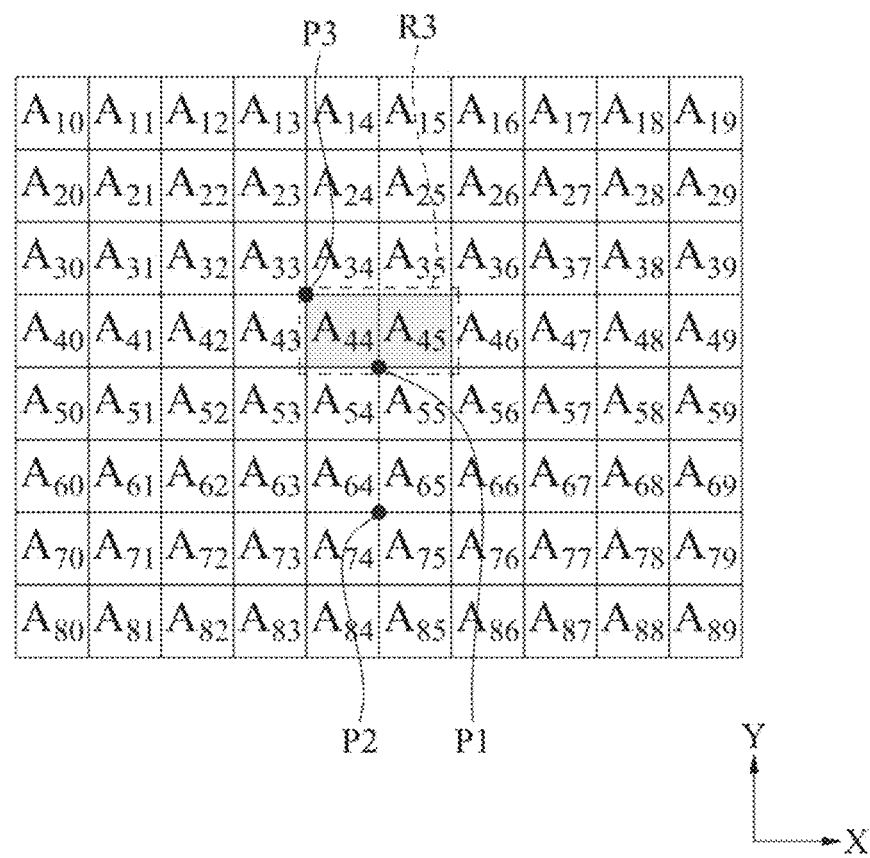
FIG. 7B is an abnormal marking process displayed according to a visual image schematic diagram (I) of some embodiments.
Figure 7C:
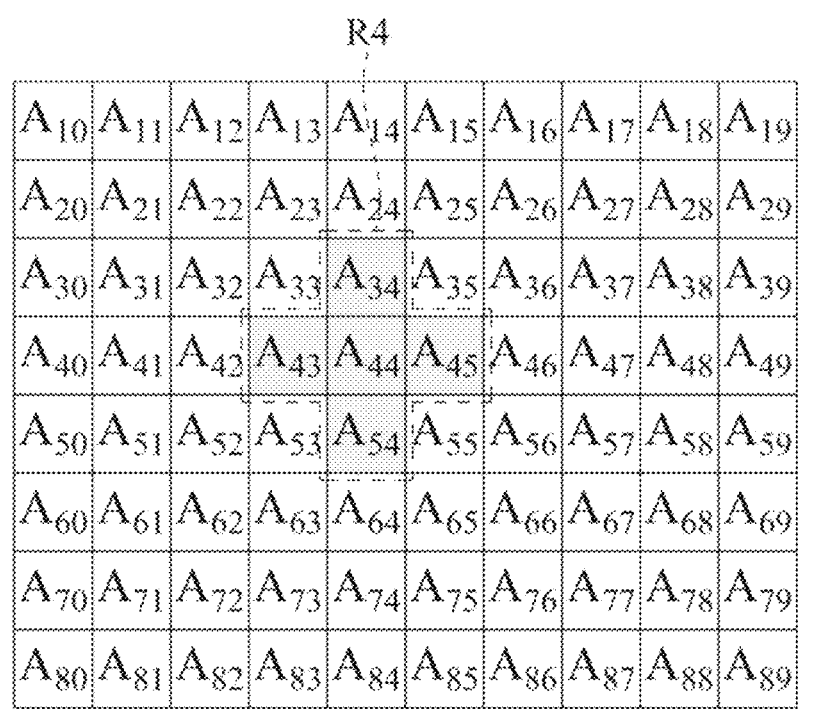

The aforementioned abnormal marking process refers to FIG. 7A to FIG. 7D, and FIG. 7A is a flow schematic diagram of an abnormal marking process of a visual image according to some embodiments. FIG. 7B to FIG. 7D are abnormal marking processes displayed according to visual image schematic diagrams (I), (II) and (III) of some embodiments. The abnormal marking processes are executed by the controller 28. The abnormal marking processes include the following steps:

S80: Determining whether an abnormal area exists, the abnormal area including adjacent thermal pixels A, and the difference between the temperature of the adjacent thermal pixels A and the average temperature being higher than a preset temperature difference; and S82: Determining whether the abnormal area is smaller than or equal to an tipper limit size in response to the abnormal area, and taking the abnormal area as an abnormal mark when the abnormal area is smaller than or equal to an upper limit size in response to the abnormal area is met. That is, when an abnormal area exists and the size of the abnormal area is smaller than or equal to the upper limit size, the thermal pixels A in the abnormal area will be taken as abnormal marks, and the processor 36 will control the display 32 to display the abnormal marks on the visual images.

In some embodiments, the abnormal area includes two or more adjacent thermal pixels A, and the difference between the temperature of these thermal pixels A and the temperature of other surrounding thermal pixels A is higher than the preset temperature difference. For example, as shown in FIG. 7B, the temperatures of a thermal pixel $A_{44}$ and the temperature of a thermal pixel $A_{45}$ have a temperature difference with the temperature of other surrounding thermal pixels A, this temperature difference is higher than the preset temperature difference, and the two thermal pixels $A_{44}$ and $A_{45}$ are adjacent, so the processor 36 will determine the thermal pixel $A_{44}$ and the thermal pixel $A_{45}$ as abnormal areas when executing step S80 of the abnormal marking process. Similarly, as shown in FIG. 7C, the temperatures of thermal pixels $A_{34}$, $A_{43}$, $A_{44}$, $A_{45}$ and $A_{54}$ have a temperature difference with the temperature of other surrounding thermal pixels A, this temperature difference is higher than the preset temperature difference, and the thermal pixels $A_{34}$, $A_{43}$, $A_{44}$, $A_{45}$ and $A_{54}$ are adjacent to each other, so the processor 36 will determine the thermal pixels $A_{34}$, $A_{43}$, $A_{44}$, $A_{45}$ and $A_{54}$ as abnormal areas when executing step S80 of the abnormal marking process. As shown in FIG. 71), although the temperature of the thermal pixel $A_{44}$ has a temperature difference with the temperature of other surrounding thermal pixels A, this difference is higher than the preset temperature difference, that there are no thermal pixels A higher than the preset temperature difference surrounding the thermal pixel $A_{44}$, the condition of "two or more adjacent" cannot meet, so that the processor 36 will not determine the thermal pixel $A_{44}$ as the abnormal area when executing step S80 of the abnormal marking process. The preset temperature difference may be, but not limited to 3° C. Generally, if the difference between the temperature of the adjacent thermal pixel A and the average temperature of the thermal pixels A in other areas is higher than 3° C., the adjacent thermal pixels A may be determined to be abnormal tissues. The abnormal tissues may be tumors or discrete tumors (the temperature is 3° C. higher than the average temperature) which may be formed at the initial stage, or may be foreign matters such as fish bones (the average temperature is 3° C. lower than the average temperature).

In some embodiments, the visual image displays different temperatures in different colors, the thermal pixel $A_{44}$ and the thermal pixel $A_{45}$ shown as 7B are displayed in gray, and the rest of the thermal pixels A are displayed in white, so the user can visually determine the temperature abnormality of the pixels. FIG. 7C and FIG. 7D are the same and are not described again. In some embodiments, when the processor 36 executes step S80 of determining to obtain the abnormal area, a conspicuous mark may not be made for the abnormal area, and abnormal mark will be provided only after execution of step S82.

In some embodiments, the upper limit size in step S82 may be the size of abnormal tissue suitable for being disposed by the disposing component 16, and the upper limit size is but not limited to 10 mm. When the abnormal area exists and the size of the abnormal area is smaller than or equal to the upper limit size, the processor 36 will take the thermal pixels A in the abnormal area as abnormal marks, and the processor 36 controls the display 32 to display the abnormal marks on the visual image (for example, dotted line frames in FIG. 7B and FIG. 7C are an abnormal area R3 and an abnormal area R4 respectively). In some embodiments, the processor 36 will display each of the thermal pixels A of the visual image according to the temperature, that is, the user can determine the thermal pixel A with abnormal temperature from the color of each of the thermal pixels A, as shown in FIG. 7B, FIG. 7C and FIG. 7D. The processor 36 will additionally present the abnormal marks with dotted line frames, as shown in FIG. 7B and FIG. 7C; and the thermal pixel $A_{44}$ in FIG. 7D is only the thermal pixel A with abnormal temperature and has no abnormal mark.

The size of the abnormal tissue suitable for being disposed by the disposing component 16 is related to the disposing component 16 and the disposing temperature, for example, if a pulse laser with a wavelength of Nd: YAG 1,064 nm is selected as a laser source connected to the disposing component 16, the disposing temperature is about 50° C., and the tissue size is larger than 10 mm, the disposing time is too long and the temperature of the disposed tissue is too high, so 10 mm is the upper limit size.

The input element 34 can be configured to receive the input signal from the user. For example, when the user detects the abnormal mark from the visual image and will dispose the abnormal tissue corresponding to the abnormal mark, the user can transmit an instruction (the input signal) for disposing the abnormal tissue through the input element 34. The input element 34 is, for example, but not limited to a keyboard. The processor 36 outputs the disposing command according to the input signal. The controller 28 receives the disposing command through the receiving component 22 and moves the head part 120 and opens the gate 266 according to the disposing command. The disposing command may include a movement instruction, a gate opening or closing instruction and/or an irradiation time length instruction.

The disposing command refers to FIG. 5 and FIG. 7B; in some embodiments, the visual image shown as FIG. 7B maps the shooting area R1 shown as FIG. 5; the visual image may correspond to a part of the shooting area R1; and the visual image is, for example, but not limited to the largest rectangular area in the shooting area R1. The central point of the shooting area R1 corresponds to a central position P1 of the visual image, and the disposing area R2 corresponds to a processing position P2 of the visual image. The preset distance D1 between the shooting area R1 and the disposing area R2 corresponds to the distance between the central position P1 and the disposing position P2. If there is an abnormal area R3, and the input signal is an automatic disposing instruction, the processor 36 will generate the disposing command according to the central position P1, the disposing position P2 and the abnormal mark. The disposing command includes a movement parameter and a time parameter. The movement parameter may be a swing angle of the head part 120, and the controller 28 will actuate the driving component 24 according to the movement parameter, so that the towing component 18 connected to the driving component 24 will pull the head part 120 to perform adjustment of a certain angle (namely, the head part 120 rotates in the +X, −X, +Y and/or −Y directions shown as FIG. 4); the disposing position P2 is aligned to one part of the abnormal area R3 (for example, but not limited to an upper left corner P3 of the abnormal area R3); and movement and scanning in the X or Y direction are started from this part until the disposing position P2 passes through the whole abnormal area R3. Since the preset distance D1 between the shooting area R1 and the disposing area R2 is the distance corresponding to the central position P1 and the disposing position P2, the processor 36 can calculate the distance and angle of the disposing component 16 to be moved, so that the disposing area R2 can be aligned with the abnormal area R3. The time parameter is the time for ablation on the abnormal tissues calculated by the processor 36. The calculation of the time parameter needs to refer to the size of the abnormal area and the power parameter of the laser. In some embodiments, the user can input the power of the used laser through the input element 34, and the computer 30 calculates the corresponding time parameter. The controller 28 first actuates the driving component 24 according to the movement parameter to enable the head part 120 to act; and after the disposing area R2 is aligned with the abnormal area R3, the gate 266 is actuated to optically couple the output end 264 of the light pipe 260 to the disposing component 16, and the laser outputted by the disposing component 16 can ablate the abnormal tissue of the abnormal area R3. After the time parameter is ended, the controller 28 will actuate the gate 266 to close again so as to stop the ablation action of the abnormal tissue of the abnormal area R3. In this embodiment, the laser apparatus 40 is manually started, that is, when the user inputs the automatic disposing instruction, the laser apparatus 40 will be manually started to emit laser.

In some embodiments, after the disposing component 16 stops ablation action on the abnormal area, the controller 28 will actuate the driving component 24 according to movement parameter to drive the towing component 18 to pull the head part 120 to perform adjustment of a certain angle, the adjustment angle and the displacement value are unchanged, and the adjustment direction is opposite to the original direction, so the thermal image capturing assembly 14 can re-capture the thermal image of the disposed abnormal area so as to determine whether there is still the abnormal area.

In some embodiments, the thermal image endoscope system includes a laser apparatus 40, such as 532 nm band of Nd: YAG laser, 532 nm band of KTP laser, 2,940 nm band of Er: YAG laser or diode laser of 800-980 nm. The laser apparatus 40 includes a light emitting tube 400. The light emitting tube 400 is coupled with the input end 262 of the light pipe 260. When the laser apparatus 40 is actuated, the light emitting tube 400 will emit the laser source to the input end 262. The laser apparatus 40 may be manually started by the user and may also be actuated by the controller 28 according to the disposing command.

In some embodiments, if the input signal is the automatic disposing instruction, the processor 36 will generate a disposing command. According to the disposing command, the controller 28 will actuate the laser apparatus 40 before the gate 266 is actuated by the controller 28 to couple the output end 264 of the light pipe 260 to the disposing component 16. Therefore, when the controller 28 controls the gate 266 to open, the laser source will irradiate the disposing area R2 through the light emitting tube 400, the light pipe 260 and the disposing component 16.

In some embodiments, if there is the abnormal area, and the input signal received by the input element 34 is the automatic movement instruction, the processor 36 will generate the movement parameter according to the central position P1, the disposing position P2 and the abnormal mark. The movement parameter is the swing angle of the head part 120, the controller 28 actuates the driving component 24 to swing according to the movement parameter, the towing component 18 connected to the driving component 24 will pull the head part 120 to be adjusted by a certain angle, and the disposing area R2 is aligned with the abnormal areas.

As shown in FIG. 1, the thermal image endoscope system can include the laser apparatus 40, and the laser apparatus 40 includes the light emitting tube 400. The light emitting tube 400 is coupled with the input end 262 of the light pipe 260. When the laser apparatus 40 is actuated, the light emitting tube 400 will emit the laser source to the input end 262.

In some embodiments, the user aligns the disposing area R2 with the disposing position P2 through the remote lever 27 of the controller 28, so the user can perform disposing action only by using the input element 34. If the input signal received by the input element 34 is the manual disposing instruction, the controller 28 will actuate the gate 266 according to the manual disposing instruction to optically couple the output end 264 of the light pipe 260 to the disposing component 16. When the laser apparatus 40 is turned on, the laser source can irradiate the abnormal area through the light emitting tube 400, the light pipe 260 and the disposing component 16.

In some embodiments, if the input signal is a manual stop instruction, the controller 28 will actuate the gate 266 according to the manual disposing instruction to stop optical coupling between the output end 264 of the light pipe 260 and the disposing component 16, and even if the laser apparatus 40 is turned on, the laser source cannot irradiate the abnormal area so as to stop ablation on the abnormal tissues.

In some embodiments, the laser apparatus 40 may also be actuated by the controller 28; when the controller 28 aligns the disposing area RC with the abnormal area according to movement parameter, and the input signal is the manual disposing instruction, the controller 28 will actuate the laser apparatus 40; and when the input signal is the manual stop instruction, the controller 28 will not actuate the laser apparatus 40. Therefore, the laser apparatus 40 can be turned on or off according to the manual disposing instruction and the manual stop instruction. If the selected laser apparatus 40 is a laser apparatus 40 with an unfixed light source wavelength, when the controller 28 actuates the laser apparatus 40, the light source power of laser emitted by the laser apparatus 40 can also be adjusted according to power parameter, and the laser is set and started at a preset power to meet the needs of the user and achieve the effect of ablation on the abnormal tissues.

In some embodiments, the controller 28 firstly actuates the driving component 24 according to the movement parameter to enable the head part 120 to act, and then actuates the gate 266 to optically couple the output end 264 of the light pipe 260 to the disposing component 16, and at the moment, the laser outputted by the disposing component 16 can ablate the abnormal tissues of the abnormal area. After the time parameter is ended, the controller 28 will actuate the gate 266 to close again so as to stop the ablation action on the abnormal tissues in the abnormal area.

In some embodiments, if there is the abnormal area, and the size of the abnormal area is larger than the upper limit size, the processor 36 will take the thermal pixels A in the abnormal area as other abnormal marks. The other abnormal marks adopt a mode different from the abnormal marks under that the "size is smaller than the upper limit size", for example, the other abnormal mark can be a solid line frame, so that the user can visually identify whether the abnormal area is larger than the upper limit size. The processor 36 controls the display 32 to display the other abnormal marks on the visual image, and records the position and the size of the abnormal area, so that the user can dispose the abnormal tissue in other modes. In some embodiments, the upper limit size of the abnormal area may be 10 mm.

As shown in FIG. 3, FIG. 3 is a sectional view of a thermal image endoscope catheter according to some embodiments. The thermal image endoscope catheter 10 includes the tube body 12, the thermal image capturing assembly 14, the disposing component 16 and the towing component 18. One end of the tube body 12 is provided with the head part 120, and the other end of the tube body 12 is provided with the connecting part 122. The thermal image capturing assembly 14 is positioned at the head part 120; and when the head part 120 enters the human body for thermal image shooting, the thermal image capturing assembly 14 will capture the thermal image from the shooting area R1, converts the thermal image into the image signal and outputs the image signal from the connecting part 122. The disposing component 16 includes the disposing head 160 and the optical fiber 162. The disposing head 160 is positioned at the head part 120; the optical fiber 162 is positioned in the tube body 12; and one end of the optical fiber 162 is positioned at the connecting part 122, and the other end of the optical fiber is coupled with the disposing head 160. The disposing component 16 is provided with the disposing area R2, and the disposing area R2 is positioned in the shooting area R1. The towing component 18 is positioned in the tube body 12 and connected to the head part 120. When the towing component 18 is actuated, the head part 120 of the tube body 12 is towed.

In some embodiments, the thermal image endoscope catheter 10 can be used as a disposable catheter of the endoscope system. The user can manually push one end, with the head part 120, of the tube body 12 into an area, requiring thermal image detection, of the human body. In some embodiments, the user can use the controller 28 to actuate the driving component 24 to adjust the head part 120 in a relatively fine amplitude. The controller 28 can be connected to the computer 30, and thus the user can input the movement instruction through the computer 30 so as to enable the controller 28 to actuate the driving component 24.

Figure 8:
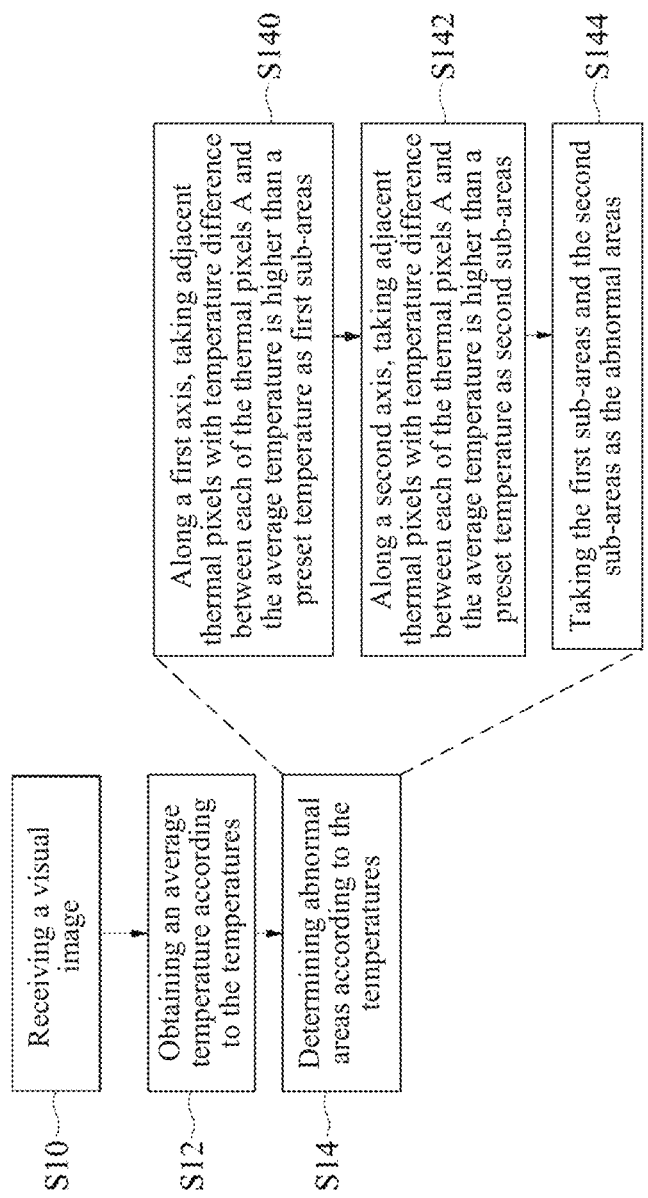
FIG. 8 is a flowchart of a method for determining abnormal areas of a thermal image according to some embodiments.

As shown in FIG. 8, FIG. 8 is a flowchart of a method for determining abnormal areas of a thermal image according to some embodiments. Unless otherwise specified, the description sequence of steps S10-S14 in the flowchart cannot limit the execution sequence of the steps of the method for determining the abnormal areas of the thermal image according to the present invention. Firstly, the processor 36 receives the visual image, the visual image includes a plurality of thermal pixels A arranged in a two-dimensional manner, and each of the thermal pixels A has a temperature (step S10). The average temperature of the visual image is obtained (step S12) according to the temperatures of the thermal pixels A. Then whether the temperature difference between each of the thermal pixels A and the average temperature is higher than the preset temperature difference is determined, whether the thermal pixels A have two or more adjacent relations is determined, and the adjacent thermal pixels A are used as the abnormal areas when both the temperature difference between each of the thermal pixels A and the average temperature is higher than the preset temperature difference, and the thermal pixels A have two or more adjacent relations is met (step S14).

In some embodiments, the two-dimensional arrangement includes a first axis and a second axis, for example, a plurality of thermal pixels A are divided into a horizontal X axis and a longitudinal Y axis. The method for determining the abnormal areas further includes: determining, along the first axis, whether the difference between the temperature of each of the thermal pixels A and the average temperature is higher than the preset temperature difference. As shown in FIG. 7C, for example, it is determined that the temperatures of the thermal pixels $A_{43}$, $A_{44}$, and $A_{45}$ are higher than the average temperature and the temperature difference is higher than the preset temperature difference. If the thermal pixels $A_{43}$, $A_{44}$, and $A_{45}$ are adjacent to each other, the adjacent thermal pixels $A_{43}$, $A_{44}$, and $A_{45}$ are used as first sub-areas (step S140); Along the second axis, whether the difference between the temperature of each of the thermal pixels A and the average temperature is higher than the preset temperature difference, for example, it is determined that the temperatures of the thermal pixels $A_{34}$, $A_{44}$, and $A_{54}$ are higher than the average temperature and the temperature difference is higher than the preset temperature difference. The thermal pixels $A_{34}$, $A_{44}$, and $A_{54}$ are adjacent to each other, the adjacent thermal pixels $A_{34}$, $A_{44}$, and $A_{54}$ are used as second sub-areas (step S142); The first sub-areas and the second sub-areas are used as the abnormal areas (step S144).

In conclusion, in some embodiments, the thermal image endoscope system can achieve the effects of detecting abnormal tissues of the human body and performing disposal through the thermal image endoscope catheter 10 and the control device 20. The method for determining the abnormal areas of the thermal image can determine the abnormal area through the thermal pixels A of the visual image.

Definitely, there are many other embodiments of the present invention, and those skilled in the art can make various corresponding changes and deformations according to the present invention without departing from the spirit and essence of the present invention, but these corresponding changes and deformations should belong to the protection scope of the claims of the present invention.

What is claimed is:

1. A thermal image endoscope system, comprising:
    a thermal image endoscope catheter comprising:
        a tube body having a head part at one end;
        a thermal image capturing assembly is positioned at the head part and the thermal image capturing assembly capturing a thermal image from a shooting area, and converting the thermal image into an image signal;
        a disposing component is positioned in the tube body, one end of the disposing component is positioned at the head part, and a disposing area of the disposing component being inside the shooting area; and
        a towing component is positioned in the tube body and connected to the head part;
    a control device comprising:
        a receiving component receiving a disposing command;
        a driving component is connected to the towing component;
        a light guide assembly comprising a light pipe and a gate, the light pipe comprising an input end and an output end, and the gate is actuated to selectively couple or decouple the output end of the light pipe to the disposing component; and
        a controller actuating the driving component according to the disposing command to drive the towing component to tow the head part to act, and actuating the gate; and
    a computer comprising:
        a display;
        an input element receiving an input signal; and
        a processor enabling the display to display a visual image according to the image signal, the processor outputting the disposing command according to the input signal;
    wherein the processor performs an abnormal marking process on the image signal, so that the display selectively displays an abnormal mark on the visual image;
    wherein the visual image comprises a plurality of thermal pixels arranged in a two-dimensional manner, and each of the thermal pixels has a temperature; and
    the processor performs the abnormal marking process, wherein the abnormal marking process comprises:
    determining whether an abnormal area exists, the abnormal area comprising adjacent thermal pixels, and determining whether the difference between the temperatures of the adjacent thermal pixels and an average temperature is higher than a preset temperature difference; and
    when the abnormal area exists and the size of the abnormal area is smaller than or equal to the upper limit size, taking the thermal pixels in the abnormal area as abnormal marks, and controlling the display to display the abnormal marks on the visual image through the processor;
    wherein the visual image comprises a central position and a disposing position; the central position corresponds to the shooting area; the disposing position corresponds to the disposing area; when the abnormal area exists and the input signal is an automatic movement instruction, according to the central position, the disposing position and the abnormal mark, the processor outputs the disposing command comprising a movement parameter, and the controller actuates the driving component according to the movement parameter to drive the towing component to tow the head part to act.

2. The thermal image endoscope system according to claim 1, wherein the visual image comprises a central position and a disposing position; the central position corresponds to the shooting area; the disposing position corresponds to the disposing area; when the abnormal area exists and the input signal is an automatic disposing instruction, the processor outputs the disposing command according to the central position, the disposing position and the abnormal mark; the disposing command comprises a movement parameter and a time parameter; and the controller actuates the driving component according to the movement parameter to drive the towing component to tow the head part to act, and actuates the gate to couple the output end of the light pipe to the disposing component until the time parameter is ended.

3. The thermal image endoscope system according to claim 2, comprising a laser apparatus, wherein the laser apparatus comprises a light emitting tube; the light emitting tube is coupled to the input end of the light pipe; and the laser apparatus is actuated to emit laser through the light emitting tube.

4. The thermal image endoscope system according to claim 3, wherein the controller actuates the laser apparatus before the controller actuates the gate to couple the output end of the light pipe to the disposing component.

5. The thermal image endoscope system according to claim 1, comprising a laser apparatus, wherein the laser apparatus comprises a light emitting tube;

the light emitting tube is coupled to the input end of the light pipe; and the laser apparatus is actuated to emit laser through the light emitting tube.

6. The thermal image endoscope system according to claim 1, comprising a laser apparatus, wherein the laser apparatus comprises a light emitting tube;

the light emitting tube is coupled to the input end of the light pipe; and the laser apparatus is actuated to emit laser through the light emitting tube.

7. The thermal image endoscope system according to claim 6, wherein when the input signal is the manual disposing instruction, the controller actuates the gate to couple the output end of the light pipe to the disposing component.

8. The thermal image endoscope system according to claim 7, wherein when the input signal is a disposing stop instruction, the controller actuates the gate to decouple the output end of the light pipe to the disposing component.

9. The thermal image endoscope system according to claim 8, wherein when the input signal is the manual disposing instruction, the controller actuates the laser apparatus; and when the input signal is the disposing stop instruction, the controller does not actuate the laser apparatus.

10. The thermal image endoscope system according to claim 1, wherein when the abnormal area exists and is larger than the upper limit size, the thermal pixels in the abnormal area are taken as other abnormal marks; and the processor controls the display to display the other abnormal marks on the visual image.

* * * * *